Figure 1:
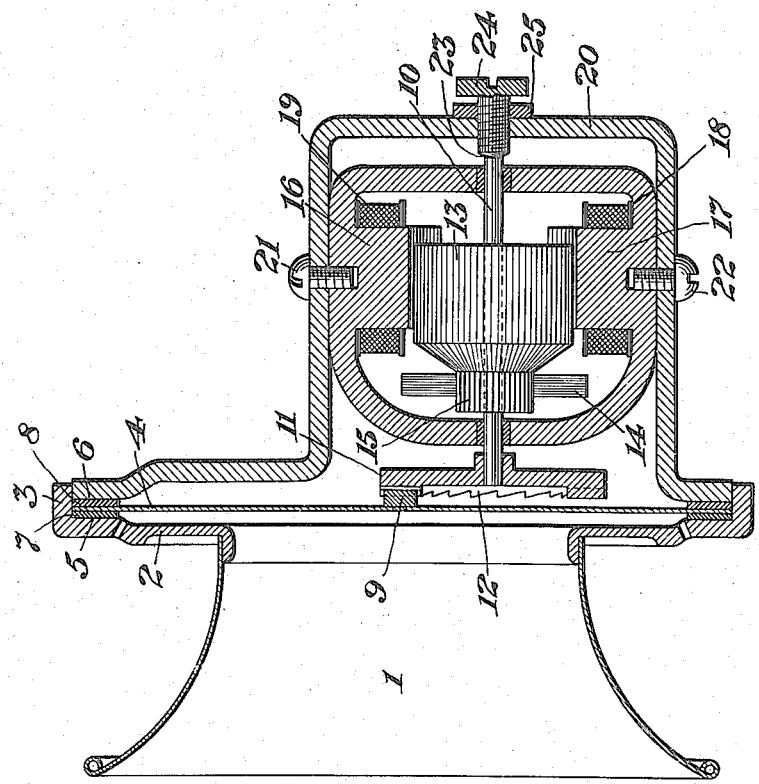

M. R. HUTCHISON.
DIAPHRAGM HORN.
APPLICATION FILED OCT. 26, 1909.

1,145,839.

Patented July 6, 1915.
3 SHEETS—SHEET 1.

WITNESSES:
Chas F. Clagett
John J. Curran

INVENTOR
Miller Reese Hutchison
BY
George C. Dean ATTORNEY

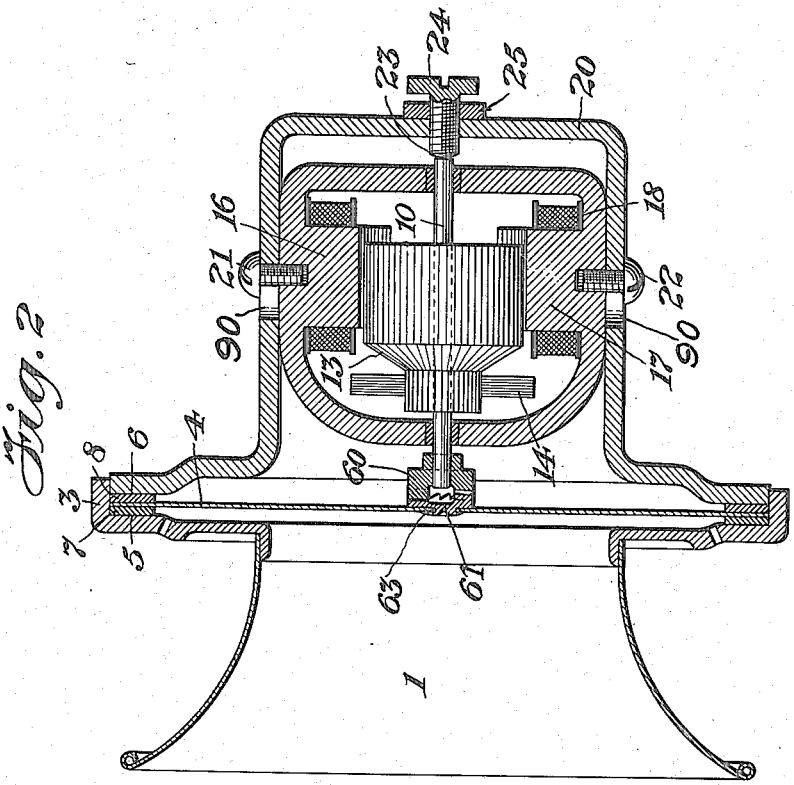

M. R. HUTCHISON.
DIAPHRAGM HORN.
APPLICATION FILED OCT. 26, 1909.
1,145,839.
Patented July 6, 1915.
3 SHEETS—SHEET 3.
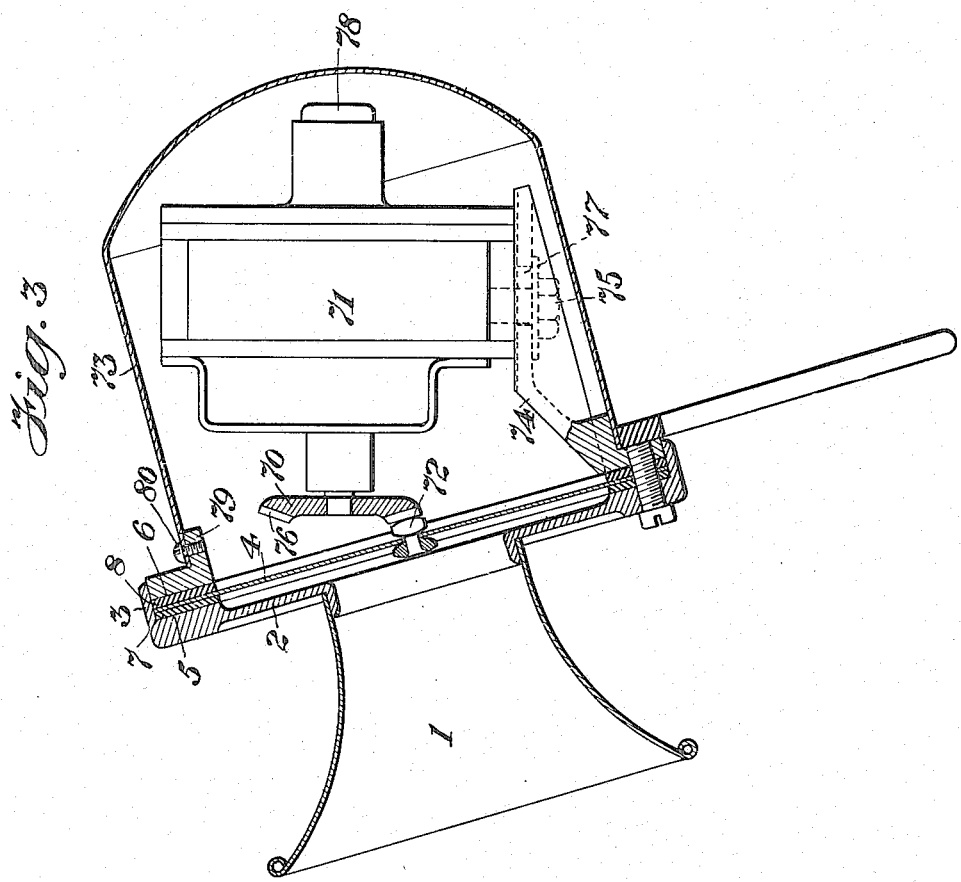
WITNESSES:
Chas. F. Clagett
John J. Curran
INVENTOR
Miller Reese Hutchison
BY
George C. Dean ATTORNEY

UNITED STATES PATENT OFFICE.

MILLER REESE HUTCHISON, OF SUMMIT, NEW JERSEY, ASSIGNOR TO LOVELL-McCONNELL MANUFACTURING COMPANY, A CORPORATION OF DELAWARE.

DIAPHRAGM-HORN.

1,145,839.   Specification of Letters Patent.   Patented July 6, 1915.

Application filed October 26, 1909. Serial No. 534,762.

*To all whom it may concern:*

Be it known that I, MILLER REESE HUTCHISON, a citizen of the United States, and a resident of Summit, in the county of Union and State of New Jersey, have invented certain new and useful Improvements in Diaphragm-Horns, of which the following is a specification.

My present invention relates to horns or signaling devices wherein a vibratory member such as a diaphragm is actuated by power derived from a rotary member or drive shaft, which may be the armature shaft of an electric motor.

More specifically considered, my present invention involves an arrangement of parts whereby the vibratory motion of the diaphragm may be derived from a drive shaft, such as the armature shaft of an electric motor, when such shaft is arranged at an angle to the plane of the diaphragm instead of parallel therewith. This is particularly desirable in the cases where the armature shaft of an electric motor is utilized as the drive shaft, since it permits a compact arrangement of the motor within a case which need not extend peripherally outside of the circumference required for inclosing the diaphragm. In order to secure the desirable features of the angular arrangement the angle should be a high angle, that is, one which will cause the reaction of the diaphragm to take effect on the shaft end-wise thereof more than transversely, and the endwise thrust begins to predominate at say 45°. Furthermore, this is about the angle where it begins to be practicable to use ordinary commercial models of motors in connection with cams of the required relatively small diameter without being compelled to drop the motor so that the frame thereof projects forward of the diaphragm as in the commercial Klaxon. In certain cases the armature shaft may be perpendicular to the diaphragm, and if desired, may be arranged concentrically therewith so that its axis passes through the center of the diaphragm. With the latter arrangement the motor case may be perfectly symmetrical. In certain cases, where the motor is arranged with its armature at an angle to the diaphragm other than a right angle, the shaft axis may be out of alinement with the center of the diaphragm, while the center of mass or volume of the motor remains in or close to a perpendicular from the center of the diaphragm.

My invention includes means whereby the rotary motion about an axis nonparallel with the diaphragm may be applied for vibrating the latter, as, for instance, face cams, or face projections carried by the rotary member, operating through a wear-piece on the diaphragm or through other suitable means adapted to produce reciprocating motion in a direction approximately parallel to the axis of the rotary motion.

Having thus described the nature of my invention, I will now describe certain practical embodiments thereof in connection with the accompanying drawings in which—

Figure 1 is a vertical section longitudinally of the drive shaft; Figs. 2 and 3 are similar views of modifications.

In Fig. 1 the horn or resonator 1, front case 2, peripheral flange 3, diaphragm 4, clamps 5, 6, and cork-like gaskets 7, 8 are of any known construction and are in fact similar to one of the forms shown in my prior application, Ser. No. 494,120, filed May 5, 1909. The wear piece 9, secured to the center of the diaphragm, may be of any known or approved construction, but is preferably formed for straight line contact with the rotary displacing member. Drive shaft 10 carries the rotary member 11 provided with one or more teeth or projections 12, the latter being face projections, preferably cut in accordance with the well known principles similar to those established for teeth of bevel or crown gears, at least so far as concerns making their sliding engagement with the diaphragm projection 9 so that it will not vary much from line of contact. In the forms shown the drive shaft 10 is the shaft of armature 13 energized through brushes 14 and commutator 15, rotating within the field of pole pieces 16, 17, energized by coils 18, 19. The motor may be any suitable rotary motor, though for most purposes I prefer a low voltage direct current, motor adapted to rotate always in one direction, regardless of the polarity of the current supplied thereto. In the form shown in this figure, the drive shaft is necessarily eccentric to the diaphragm by an amount equal to the radius of the face cam; hence, if the motor frame be symmetrical as shown, and if the case 20 be no larger than is necessary to inclose the motor, the construction will be somewhat eccentric with respect to the diaphragm and the horn section of the case. Obviously, the motor case may be made symmetrical by making it larger than is necessary, and the eccentricity of the motor may be decreased by decreasing the diameter of the face cam or by tilting the motor as shown in Fig. 3 so that its center of mass or volume practically coincides with a line perpendicular to the axis of the diaphragm.

In Fig. 1 the motor frame is secured in the case by screws 21, 22, and the armature shaft 10 carrying the face cam 11 is limited as to endwise displacement rearwardly by means of a thrust bearing 23, which is preferably mounted upon and formed integral with a set screw 24 provided with a lock nut 25. In order to insure firm contact of the shaft cam with its thrust bearing I may displace the armature longitudinally of its shaft in the direction of the diaphragm so that the solenoid action of the motor field will draw the shaft rearwardly as far as permitted by the thrust bearing. This affords the simplest possible means for adjusting the cam with respect to the diaphragm projection so as to secure the best results.

While the above described face cam is an efficient means for transforming the rotary motion of the perpendicular drive shaft into vibratory motion of a diaphragm at an angle thereto, by partly forced and partly free movements, I may employ any other desired mechanical movement for this purpose, preferably those which permit arranging the drive shaft with its axis passing through the center of the diaphragm, preferably perpendicular thereto. One such arrangement is shown in Fig. 2, wherein the motor may be substantially the same as in Fig. 1, except that being symmetrically arranged with respect to the center of the diaphragm the inclosing case is concentric therewith, and the entire device is symmetrical with respect to a straight line passing through the axis of the horn and the center of the diaphragm.

In said Fig. 2 the horn, diaphragm, front case, motor, and motor case may be substantially the same as in Fig. 1. The shaft 10, armature 13, thrust bearing 23, and adjusting screw 24 are also arranged as shown in Fig. 1, the principal difference between Figs. 1 and 2 being that the armature shaft is arranged with its axis passing through the center of the diaphragm perpendicularly thereto, and the face cam 60 is made of smaller size, and of such form that diametrically opposite projections of the latter simultaneously engage diametrically opposite projections formed or provided on the diaphragm or on a wear piece 61 secured thereto. This arrangement has the advantage that the rotary cam acts simultaneously in opposite directions so that the lateral components of the two blows tend to produce rotary motion or effect on the wear piece instead of lateral tilt. The rotary effect may be readily resisted by tight riveting or welding of the wear piece to the diaphragm. The shank may be keyed to the diaphragm as by flattening as indicated at 63.

In the arrangement shown in Fig. 3 the broad features of construction and operation are not materially different from those of the device shown in Fig. 1, but it will be noted that the rotary member 70 is somewhat smaller in diameter, and that the motor 71 has been shifted about the diaphragm wear piece 72 as a center so that the center of volume or mass of the motor lies in or close to a line perpendicular to the diaphragm passing through the center thereof. By this arrangement the motor has been brought well within the periphery of the diaphragm clamps 5, 6 and the case 73 covering the same is correspondingly of less diameter than said clamps and is symmetrical with respect to the axis of the horn, 1.

Various minor differences with respect to the mounting of the motor may be noted as follows: The rear clamp 6 of the diaphragm is a mere skeleton instead of a complete case and it carries formed or secured thereto a rigid support 74 to which the motor is adjustably connected by a bolt 75 passing through a slot 77 shown in dotted lines. This support and connection for the motor should be formed so that adjustment of the rotary member 70 to and from the wear piece 72 on the diaphragm may be effected, and in the form shown such adjustment is along a line parallel to the axis of the motor. The motor axis being at an angle to the plane of the diaphragm, the face cams 76 carried by such member are formed on a bevel so that the elements thereof are substantially parallel with the diaphragm.

The case of the motor is not broken away to show the internal construction since this part of the device is standard construction, such as may be obtained in the market. The motor as a unit being adjustably mounted, the set screw for adjusting the armature shaft, which is shown in Figs. 1 and 2, need not be employed, the motor being provided with an ordinary thrust bearing for the armature shaft within the boss 78. With this construction the parts may all be assembled without the rear case, the latter being applied over the flange 79 and secured thereto as by screws 80.

In all of the forms above shown it is possible to make the face cam automatically self-adjusting without the necessity of a thrust bearing for the armature shaft which carries said cam. This may be accomplished by adjusting the motor so that the solenoid pull of the field upon the armature is toward the diaphragm. Referring to Fig. 2 the desired result may be accomplished by adjusting the frame and field of the motor by loosening the securing screws 21, 22 and sliding them forward along the slots 90. In Fig. 3 a similar adjustment may be had by means of bolt 75 and slot 77 but in this case the projections of the bevel face cam should be made wide enough so that the required adjustment may be effected without moving them laterally out of range of square impingement upon the diaphragm projection.

With the above described arrangement the cam and armature shaft will automatically find an intermediate position which will be a result of the solenoid pull toward the diaphragm and the cam thrust away from the diaphragm. When this arrangement is used in the device of Fig. 2 the adjustable thrust bearing may be arranged as a limiting stop to prevent the cam from being forced entirely out of range or contact with the diaphragm projection, as might occur at high speeds or with a very stiff diaphragm or where the solenoid pull toward the diaphragm is not sufficiently strong.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the device and of its operation, may be made without departing from my invention.

I claim:

1. In a horn or signaling device, a diaphragm, a drive shaft presented endwise toward the plane of the diaphragm, an endwise acting rotary face cam carried by said shaft for imparting bodily vibrations to said diaphragm toward and from said cam, and means for adjusting said shaft end-wise.

2. In a horn or signal device, a diaphragm, a motor having a longitudinally adjustable armature shaft arranged at right-angles to the diaphragm at its center and diaphragm actuating elements carried by said armature shaft, whereby relative adjustment of the diaphragm and diaphragm actuating elements may be effected.

3. In a horn or signaling device, a diaphragm, a motor having its armature shaft approximately normal to the diaphragm, a cam on said shaft having faces presented toward the diaphragm, and means for effecting adjustment of said motor in a direction parallel to the axis of its armature shaft.

4. In a horn or signaling device, a diaphragm, a motor having its armature shaft approximately normal to the diaphragm, a cam on said shaft having faces presented toward the diaphragm, and means for effecting adjustment of said motor in a direction parallel to the axis of its armature shaft, and means for effecting longitudinal adjustment of said armature shaft.

5. In a horn or signaling device, a diaphragm, means for mechanically agitating the diaphragm, including a motor having its armature shaft at an angle to the diaphragm, diaphragm actuating means carried by said shaft and means for limiting the longitudinal movement of said armature shaft away from the diaphragm, the field and armature of said motor being axially displaced so as to hold said shaft against said means by solenoid action.

6. In a horn or signaling device, a diaphragm, means for mechanically agitating the diaphragm, including a motor having its armature shaft arranged at an angle to the diaphragm, diaphragm actuating means carried by said shaft, and means for adjusting said armature shaft longitudinally toward said diaphragm, the field and armature of said motor being axially displaced so as to hold said shaft against said means by solenoid action.

7. In a horn or signaling device, a diaphragm, and mechanical means for agitating the diaphragm, said means including a motor having its armature shaft arranged at an angle to the diaphragm, diaphragm actuating means carried by said shaft, the field and armature of said motor being relatively displaced in an axial direction, whereby the field exerts a solenoid action on the armature and shaft.

8. In a horn or signaling device, a diaphragm, a plurality of contacts disposed radially about the axis of the diaphragm, and mechanical means for agitating the diaphragm including a rotary driver adapted to engage said contacts.

9. In a horn or signaling device, a diaphragm, diametrically opposed contacts disposed about the axis of the diaphragm, and mechanical means for agitating the diaphragm including a rotary driver having diametrically opposed impact members adapted to engage simultaneously with diametrically opposed contacts.

10. In a horn or signal, a diaphragm, a power shaft approximately normal to the diaphragm, a rotary head carried by said shaft and a plurality of diaphragm displacing elements carried by said head and distributed about the axis thereof together with a plurality of circularly distributed coöperating elements on the diaphragm, whereby displacing efforts are applied at a plurality of points away from the center of the diaphragm.

11. In a horn or signal, a diaphragm, a power shaft approximately normal to the diaphragm, a rotary head carried by said shaft and a plurality of diaphragm displacing elements carried by said head and distributed about the axis thereof together with a plurality of circularly distributed coöperating elements on the diaphragm, whereby displacing efforts are applied at a plurality of points away from the center of the diaphragm, in combination with a rotary armature for said shaft, field magnets disposed symmetrically with respect thereto, a support for the latter, and means whereby the latter may be adjusted in a direction parallel to said shaft.

12. In a horn or signal, a diaphragm, a symmetrical case arranged with its axis perpendicular to the diaphragm at its center, an electric motor having its armature shaft presented end-wise to the diaphragm within said case, a rotary head on said armature adjacent to said diaphragm, a plurality of diaphragm vibrating elements arranged on the face of said head circularly about the axis thereof, and means for effecting adjustment of said motor in a direction parallel to its shaft and means for longitudinally adjusting said shaft relatively to its field coils.

13. In a horn or signal, a diaphragm, a symmetrical case arranged with its axis perpendicular to said diaphragm, an electric motor and means for applying the power of said motor to vibrate said diaphragm, said means comprising an armature shaft element for said motor having its axis perpendicular to said diaphragm at its center, and a diaphragm engaging element carried by said shaft; said diaphragm being provided with a plurality of inequalities adapted for lateral engagement by said diaphragm engaging element.

14. In a horn or signaling device, the combination of an elastic diaphragm, a pair of diaphragm clamping members, a high speed electric motor secured to one of said members and having its shaft presented endwise to said diaphragm, a rotor on said shaft presenting a circularly arranged series of projections for effecting bodily vibration of said diaphragm toward and from said rotor, and an adjustable thrust bearing for limiting the axial rearward movement of said shaft and said rotor under the reaction of said diaphragm, the location and arrangement of parts being such that said shaft is retained in engagement with said thrust bearing, throughout the range of normal adjustment and operation of the device.

15. In a horn or signal device, a diaphragm, a motor having an armature shaft arranged at right angles to the diaphragm, diaphragm actuating elements carried by said armature shaft, and means for producing relative adjustment of the diaphragm and diaphragm actuating elements.

16. In a horn or signaling device, a diaphragm having a wear piece, means for mechanically agitating the diaphragm, including a motor having its armature shaft arranged at an angle to the diaphragm, diaphragm actuating means carried by said shaft and means for axially adjusting said shaft and actuating means to vary the overlap of said means on said wear piece.

17. In a horn or signaling device, a diaphragm having a wear piece, means for mechanically agitating the diaphragm, including a motor having its armature shaft arranged at an angle to the diaphragm, a rotor carried by said shaft and having face projections for engagement with said wear piece and means for limiting the rearward axial movement of said shaft and rotor, the shaft being held against forward movement by engagement of said rotor with said wear piece.

18. In a horn or signaling device, a diaphragm having a wear piece, a cylindrical electric motor having its armature shaft disposed substantially at right angles to said diaphragm and having a face cam for engagement with said wear piece, the diameter of said face cam being materially less than that of the armature, and the field of said motor being concentric with said diaphragm and of less diameter than the latter whereby said motor and face cam are disposed within a cylinder having its axis perpendicular to the center of the diaphragm and having substantially the circumference of the diaphragm supporting means.

Signed at New York city, in the county and State of New York, this 25th day of October, A. D., 1909.

MILLER REESE HUTCHISON.

Witnesses:
GEORGE C. DEAN,
IRVING M. OBRIEGHT.